(12) United States Patent
Baker-Finch et al.

(10) Patent No.: US 12,456,949 B2
(45) Date of Patent: Oct. 28, 2025

(54) PHOTOVOLTAIC CONVERTER AND PHOTOVOLTAIC ARRAYS

(71) Applicant: 5B IP Holdings Pty Ltd, Mascot (AU)

(72) Inventors: Simeon Baker-Finch, Mascot (AU); Christopher McGrath, Mascot (AU); Rhett Evans, Mascot (AU); Adrian Turner, Mascot (AU)

(73) Assignee: 5B IP Holdings Pty Ltd, Mascot (AU)

( * ) Notice: Subject to any disclaimer, the term of this patent is extended or adjusted under 35 U.S.C. 154(b) by 0 days.

(21) Appl. No.: 18/498,464

(22) Filed: Oct. 31, 2023

(65) Prior Publication Data

US 2024/0146240 A1    May 2, 2024

(30) Foreign Application Priority Data

Oct. 31, 2022   (AU) ................ 2022903226

(51) Int. Cl.
*H02S 40/36* (2014.01)
*H02S 30/20* (2014.01)

(52) U.S. Cl.
CPC .............. *H02S 40/36* (2014.12); *H02S 30/20* (2014.12)

(58) Field of Classification Search
None
See application file for complete search history.

(56) References Cited

U.S. PATENT DOCUMENTS

| 2009/0242015 A1 | 10/2009 | Wattman et al. |
| 2012/0312354 A1 | 12/2012 | Buettner |
| 2013/0118558 A1 | 5/2013 | Sherman |
| 2013/0133721 A1 | 5/2013 | Balyon |
| 2014/0182650 A1 | 7/2014 | Lochun |
| 2014/0196770 A1* | 7/2014 | Jacobs, IV ............. H02S 40/34 136/251 |

(Continued)

FOREIGN PATENT DOCUMENTS

| CN | 210273965 | 4/2020 | |
| JP | 2021034683 A | 3/2021 | |
| WO | WO-2022271675 A1 * | 12/2022 | ............... E04D 1/30 |

OTHER PUBLICATIONS

Australian Search Report in related AU Application 2022903226 dated Mar. 30, 2023, 24 pages.

*Primary Examiner* — Dustin Q Dam
(74) *Attorney, Agent, or Firm* — HOVEY WILLIAMS LLP

(57) ABSTRACT

A PV array (10) comprising multiple PV modules (11, 12) that each have a first and second pairs of spaced apart terminals (28, 40), with the first pair of spaced apart terminals (28) being in electrical connection with the PV cells of the PV modules (11, 12). A by-pass conductor (30) connects the second pair of spaced apart terminals (40) and enables current to pass through the PV modules (11, 12) between the second pair of spaced apart terminals (40). The second pair of terminals (40) of a first PV module (11) are each connected electrically to a terminal (28) of the first pair of terminals (28) of two adjacent PV modules to which the first PV module is connected. The by-pass conductor (30) of the first PV module facilitates travel of electrical current from the first PV module to a second PV module, by connection of the first terminals (28) of the first PV module (11) to the second terminals (40) of the second PV module (12).

21 Claims, 5 Drawing Sheets

(56) References Cited

U.S. PATENT DOCUMENTS

| | | |
|---|---|---|
| 2014/0305493 A1 | 10/2014 | Dhir et al. |
| 2015/0179848 A1* | 6/2015 | Korman .................. H02S 30/20 |
| | | 29/592.1 |
| 2017/0331425 A1 | 11/2017 | Allen |
| 2018/0115275 A1 | 4/2018 | Flanigan et al. |
| 2018/0269827 A1* | 9/2018 | Gong ...................... H02S 40/32 |

* cited by examiner

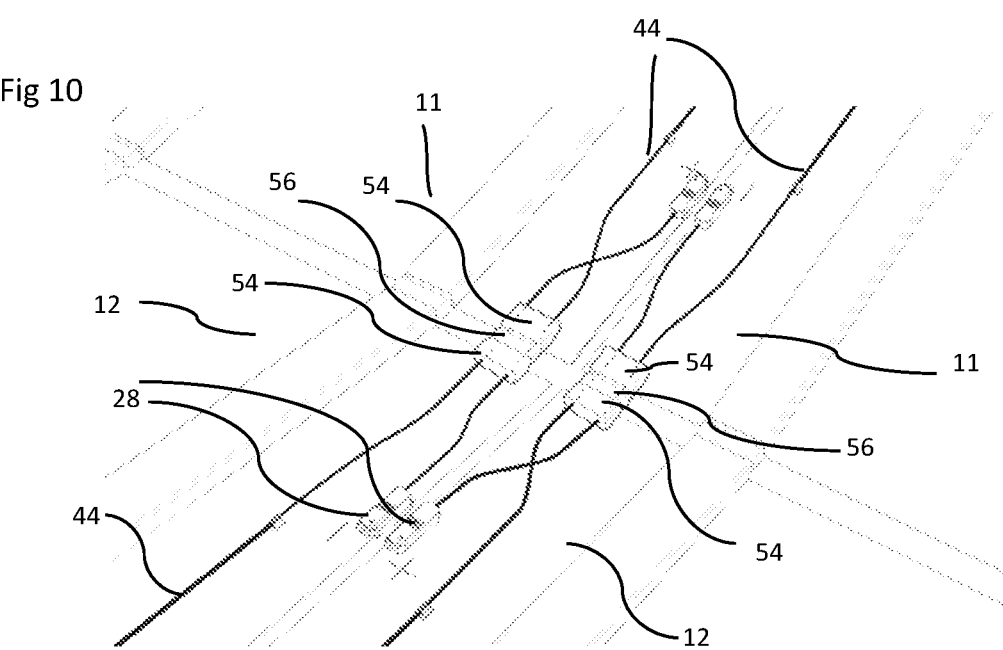

PHOTOVOLTAIC CONVERTER AND PHOTOVOLTAIC ARRAYS

PRIORITY CROSS-REFERENCE

The present application claims priority from Australian Provisional Patent Application No. 2022903226 filed 31 Oct. 2022, the contents of which is to be considered to be incorporated into this specification by this reference.

TECHNICAL FIELD

The present invention relates to a photovoltaic (PV) module and to arrays of three or more PV modules that are connected electrically together.

BACKGROUND OF THE INVENTION

The discussion of the background to the invention that follows is intended to facilitate an understanding of the invention. However, it should be appreciated that the discussion is not an acknowledgement or admission that any aspect of the discussion was part of the common general knowledge as at the priority date of the application.

PV modules use solar cells, which are well known devices that convert light energy (electromagnetic or solar radiation) directly into usable electric energy or current via a photoelectric effect to supplement electricity supply from the normal grid supply, or to feed back into the normal grid supply, or to operate as a standalone electrical supply. The process of photoelectric conversion is well known. A PV module can also be described as a solar module, a PV panel or a solar panel. All of these descriptors relate to a square, or more usually a rectangular, unit comprised of many solar or PV cells.

Nowadays, PV modules of different sizes can be found on the market. In general, the average physical size of commercial PV modules, and nominal power outputs (measured in watts), have increased overtime.

PV systems usually comprise multiple PV modules or panels that are formed from multiple PV cells. The PV modules or panels are usually mounted within a frame which allows the PV system to be mounted on suitable structures. These structures include the roofs of domestic dwellings and commercial buildings, and at ground level, such as on concrete or earth surfaces and in PV solar energy farms. Multiple PV modules or panels are generally connected together to form electrical strings in a PV array. In some instances, PV modules can be frameless and consist of multiple solar cells encapsulated between glass or polymer substrates.

In the case of solar farms, PV modules are generally transported to a site where a framing structure is built. The modules are then secured to the framing structure and connected to form large PV arrays. For this application, the maximum size and weight of the PV modules is generally dictated by handling constraints, during transport and installation.

Once installed, energy generation from a PV array is highly dependent upon the configuration of the PV modules—that is, the 3D spatial orientation of the modules. A PV module or panel (hereinafter a PV module) generates optimal output when it is positioned at an angle which is normal to the incidence of the sun's rays at any given time. Due to the diurnal and seasonal movement of the sun, maintaining an optimal orientation of the PV modules is difficult and requires the PV modules to be mounted for movement to track the path of the sun diurnally and/or seasonally. Given the complexity in mounting PV modules for this kind of movement, PV modules are more often fixed at a tilt and orientation which is a compromise to achieve the maximum possible electrical generation without tracking movement.

Non tracking PV arrays include, amongst others, flat arrays, whereby the modules are laid out in a planar configuration and, "east-west" PV arrays, in which adjacent PV modules form a triangular configuration and face in different directions. The expression "east-west" does not require a PV installation to be oriented in an actual east-west direction, but rather, is an expression used to describe the triangular configuration that PV arrays can be formed in. That expression has been adopted on the basis that ideally, PV arrays are installed with the PV modules formed in a triangular or undulating configuration with adjacent PV modules facing respectively east and west. As will be apparent from the above discussion, this promotes maximum solar capture during passage of the sun throughout the day and thus maximum electrical output from the PV array. However, the expression is not intended to require precise east-west alignment or orientation of the PV modules in the PV array and indeed, it could often be the case that PV modules cannot be installed in precise east-west alignment due to space or geographical limitations. An east-west configuration could be installed offset from actual east-west where space or geographical limitations precluded the PV array from being installed in an east-west orientation. In an extreme example, an east-west configuration could be adopted or installed in a north-south orientation if space or geographical limitations did not permit installation other than in that orientation. The triangular configuration of such an installation would still be termed an "east-west configuration" despite that the orientation of the configuration is not in an east-west orientation.

Planar configurations include horizontal configurations, such as on flat roofs or ground, or inclined configurations that are employed on tilted roofs for example. The present invention has been developed for use with triangular or east-west configurations, although it can be used with any configuration having adjacent PV modules.

An east-west configuration splits or separates adjacent PV panels into forward or east facing PV panels and rearward or west facing PV panels. These can be considered to be two sub-arrays of PV modules, with one sub-array orientated in one direction, ie towards the east and the other sub-array orientated in an opposite direction, ie towards the west. The modules can be arranged in rows of alternating east-west PV modules, which are in end-to-end connection or alignment, with each row arranged as a series of successive triangles each made up of one east-facing and one west-facing module. This orientation allows the sun to pass over a pair of east-west PV modules, so that the sun's rays first strike the east facing module in the morning and progressively move over the modules so that the rays finish striking the west facing module at the end of the day. During a major portion of the sun's path over the modules, rays will strike both modules, but at opposite ends of the day, the rays will strike just one of the modules. Accordingly, at opposite ends of the day only one of the pair of PV modules will produce electrical current. Moreover, depending on the angle of incidence, the pair of modules will generate different amounts of electrical current, except when the sun is directly over the top of the pair of modules so that they receive, for a short period of time, the same amount of solar radiation.

Because the east facing PV modules will generally produce different amounts of electrical current to the west facing modules, depending on the orientation of the sun relative to the modules (except when the sun is directly over the PV modules) PV installations comprising multiple arrays of east-west PV modules tend to electrically connect in series east facing PV modules together and separately from west facing PV modules. This is to avoid limiting the power output of the PV system due to the non-uniform solar radiation striking the east facing and west facing arrays. Efficiency of electrical output from a PV installation is maximised where transmission is through PV modules that have the same or similar electrical output and in the case of an east-west installation, the east facing PV modules will all have generally the same electrical output as will the west facing PV modules, even though the electrical output of the respective east and west facing PV modules will be different throughout the day (except at midday). Moreover, transmission through a PV module requires that PV module to be generating electrical current and so at opposite ends of the day, when only the east or the west facing PV modules are generating electrical current, transmission through non-generating PV modules is not possible. In this latter case, the PV modules generating electrical current have to be connected together or the installation will have limited electrical output. This further supports electrical connection of east facing PV modules to each other and west facing PV modules to each other in series by separate connected electrical strings.

The connection of multiple east facing PV modules or arrays (hereinafter "arrays") separately from west facing PV arrays has to date been by standard cabling which for example, connects to a first east facing PV array, is routed along an adjacent west facing PV array and connects to the next east facing PV array that is adjacent to the west facing PV array. The cabling of the east facing PV arrays thus skips connection with the west facing PV arrays. The routing of the cabling can be as simple as allowing the cabling to loosely hang or dangle between connections with the east facing PV arrays, or to lie on the ground between them. Alternatively, cable ties or clips can be used to more securely route the cabling such as to the frames of the PV arrays. Similar cabling connects the west facing PV arrays.

A drawback with the cabling arrangements discussed above, particularly for a pre-assembled portable or redeployable PV arrays, is that they can interfere with activities associated with the PV arrays during one or more of storage, deployment or operation of the PV arrays. In storage, the cables can hang or dangle outside the envelope of the stored PV arrays and can be catch hazards for personnel and equipment in a storage environment, such as a warehouse. Also, if the loose cabling lies on the floor of the warehouse, it can be damaged by vehicles operating within the warehouse (forklifts for example) driving over the cabling, or it can be pulled from connection with the PV arrays. During deployment, the cabling needs to be carefully installed and monitored to ensure it does not catch as PV arrays are expanded (and the same when PV arrays are being collapsed together for transport or storage). Alternatively, the cabling needs to be installed after deployment and removed before transport or storage, adding an extra and significant task to the deployment process. During operation, when the PV arrays are expanded for electrical generation, the cabling can be a catch or tripping hazard for personnel and equipment, particularly for personnel involved in maintenance. Importantly, if a cable extending between a pair of east facing PV arrays is disconnected accidentally, the transmission of electrical current between the PV arrays will terminate and until the accidental disconnection is recognised and rectified, electrical generation by the pair of east facing PV arrays will discontinue.

The Applicant has filed earlier patent applications to PV systems comprising arrays of modules that have east-west configurations and these include PCT/AU2015/050603 (WO2016/049710) and PCT/AU2016/051253 (WO2017/100862). The applicant has continued development in this field and the present invention is directed to improvements in the manufacture and/or operation and/or maintenance of PV arrays, particularly those arrays intended to have east-west configurations.

SUMMARY OF THE INVENTION

According to the present invention there is provided a PV array comprising multiple PV modules, each PV module comprising:
  a. a plurality of PV cells arranged in a generally square or rectangular grid formation, the plurality of PV cells being connected electrically;
  b. a first pair of spaced apart terminals in electrical connection with the plurality of PV cells to draw electrical current from the PV module;
  c. a second pair of spaced apart terminals and a by-pass conductor connecting the second pair of spaced apart terminals, the by-pass conductor enabling current to pass through the PV module between the second pair of spaced apart terminals;
    the multiple PV modules being connected to each in a triangular configuration so that adjacent PV modules are at an angle to each other and face in opposite directions,
    wherein the second pair of spaced apart terminals of a first PV module of the multiple PV modules are each connected electrically to a terminal of the first pair of spaced apart terminals of two adjacent PV modules to which the first PV module is connected,
    the by-pass conductor of the first PV module of the multiple PV modules facilitates travel of electrical current from the first PV module through, over or across a second PV module of the multiple PV modules, by connection of the first terminal of the first PV module to the second terminal of the second PV module.

The present invention also provides a PV module for use in a PV array.

The PV array of the present invention can be an east-west array. Reference herein to "east-west" will be consistent with the previous discussion in which it was noted that east-west is a descriptor for a triangular shaped PV array and is not a requirement for precise east-west orientation.

In some embodiments, the PV module has a surface area larger than 10 m$^2$, in contrast with PV modules commercially available at the time of filing this application.

In other embodiments the PV module consists of a plurality of smaller or secondary PV modules connected to each other mechanically and electrically within a primary PV module, such as within a frame or, in the case of a frameless module, within the encapsulation structure. The primary PV module can include a pair of spaced apart terminals for each secondary PV module. These secondary PV modules may include a portion of the by-pass conductor. Each secondary module may be connected to another secondary module via cables or rigid busbars. The terminals can be junction boxes.

The PV module according to the present invention employs a by-pass conductor which passes through, under, over or across the PV module between the second pair of spaced apart terminals, or from one of the second pair of spaced apart terminals to the other, so that electrical current can travel through by-pass conductor between the second pair of spaced apart terminals of the PV module for electrical connection to two adjacent PV modules. The PV module can, for example, be an east facing PV module which is physically connected to or adjacent to two west facing PV modules, so that the by-pass conductor facilitates travel of electrical current from one of the west facing PV modules to the other west facing PV module through, over or across the east facing PV module, but without the electrical current connecting electrically to the east facing PV module. Thus, the by-pass conductor is electrically insulated or separated from the electricity generating PV cells of the east facing PV module, but the by-pass conductor provides a pathway for electrical current to travel between the pair of west facing PV modules. Thus, even if the east facing PV module is not generating any electrical current, electricity generated by the west facing PV modules travels through those west facing modules for collection at an outlet of the PV array.

The by-pass conductor of the PV module of the present invention thus provides an electrical connection through, over or across the PV module of which it is associated. The use of the by-pass conductor means that cabling does not need to be connected to extend from one east facing PV module to the next, but rather, a pair of east facing PV modules or array of east facing PV modules, can be connected to the second pair of spaced apart terminals of a west facing PV module or array of PV modules, so that electrical current can travel from one of the east facing PV modules or arrays of PV modules to the other via the by-pass conductor that forms part of the west facing PV module or array of PV modules. Because the by-pass conductor is part of or integrated into each PV module, external cabling extending between the east facing PV modules is not required. Hazards associated with the use of the external cabling that have been described above and can be overcome or at least alleviated by the use of the by-pass conductor.

In an east-west PV module configuration, the present invention permits all of the east facing PV modules to be connected electrically together and for all of the west facing PV modules to be connected electrically together. Because an east-west PV module configuration comprises alternating east and west facing PV modules, it is the by-pass conductor that facilitates the electrical connection between the respective east facing PV modules and west facing PV modules. For the east facing PV modules, each west facing PV module located between a pair of east facing PV modules is by-passed electrically by connection of first terminals of the east facing PV modules to the second terminals of the intervening west facing PV module. Connection of a pair of east facing PV modules to the second terminals of an intervening west facing PV module causes electrical current to travel through the by-pass conductor of the west facing PV module, thus avoiding connection electrically between the east facing PV modules and the intervening west facing PV module.

The by-pass conductor can have any suitable form. The conductor can be a solid conductive bar for example. The bar can be insulated from other parts of the PV module, or at least from conductive parts of the PV module. Insulation can be by spacing between the conductor and other parts of the PV module, so that an air gap exists between the by-pass conductor and other parts of the PV module. Alternatively, the conductor can be enclosed within an insulation layer. The by-pass conductor can for example be of a standard form of cable in which an internal wire conductor is encased in an outer sheath, such as a rubber sheath.

The conductor can be an external or an internal component of the PV module. The conductor can thus extend along a peripheral part of PV module, such as along a peripheral part of frame components of the PV module. This might be externally of the frame, so that the conductor might extend along the outside of an end or side edge of the PV module, supported by peripheral parts of the frame. In other arrangements, the conductor can extend within frame components, such as through a peripheral part of a PV module frame. The frame can include a cavity or channel to accommodate the by-pass conductor. The first and second pairs of terminals of the PV module may be placed in any location which readily facilitates interconnection between PV modules during assembly or other related activities of a PV array.

PV modules according to the present invention will typically comprise PV cells that are framed or sandwiched between glass or polymer panels, so that the panels form a frame or laminate for sandwiched PV cells. PV modules can also have a peripheral frame, such as a metal, say aluminium frame, that extends about the side and end edges of the PV module. PV modules can also have rails extending along the underneath face of the PV module to provide structural support across the body of the PV module between the side and/or end edges. These rails can be metal rails, such as aluminium rails or composite rails.

The frame can include peripheral parts or components, such as side edge and end edge frame sections along which or within which the by-pass conductor extends or terminates. The frame can also include components or parts inboard of the side edge and end edge frame sections, such as the rails discussed above, and the by-pass conductor can alternatively extend through, under, over or across such an inboard frame part.

The PV module can include more than one by-pass conductor if the load to be carried by a single conductor is considered to be too great. This allows multiple conductors, for example of smaller capacity, to be employed. This can also be appropriate where space requirements do not allow a by-pass conductor of sufficient bulk to be accommodated within or on parts of the PV module frame or when the module is frameless. In frameless modules several by-pass conductors can be integrated into the laminate of the encapsulation structure.

In some forms of the invention, terminals of one PV module connect to respective terminals of a pair of adjacent PV modules by a connection assembly that comprises integrated connectors associated with the respective PV modules. In these forms of the invention, the integrated connectors can connect together with the ability to articulate so that the PV modules can be rotated relative to each other between collapsed and operational conditions without the integrated connectors disconnecting.

In some forms of the invention, the PV array comprises first and second rows of PV modules in which current flows in strings in a first direction through the first row of PV modules and returns in the opposite direction through the second row of PV modules. In these forms of the invention, turn around cables can be used in end or edge PV modules to redirect the current path through 180 degrees. For two rows of PV modules, two strings can be employed, one being an east PV module string and one being a west PV module string. The strings have terminals (4 total) that are located at the same end of the PV array.

The use of the word "strings" is a reference to the electrical connection of rows of PV modules that are connected in series. PV arrays can include any number of strings through which current travels. Current can be discharged from opposite ends of a PV array through the strings, or turn around cables as mentioned above, can be employed so that discharge is from just one end or edge of the PV array. Still further, a PV array can be separated into parts, and those parts can generate electricity separate from each other and discharge can be made at different points of the PV array. In some forms of the invention, a long PV array is formed of rows of four or more strings of PV modules, but the PV array is separated into two parts, halves for example, and current is extracted from either end of the PV array from each part of the array.

BRIEF DESCRIPTION OF THE DRAWINGS

In order that the invention may be more fully understood, some embodiments will now be described with reference to the figures in which:

FIG. 10 is a detailed view of articulated electrical connections at the apex of four connected PV modules.

DETAILED DESCRIPTION

Figure 1:
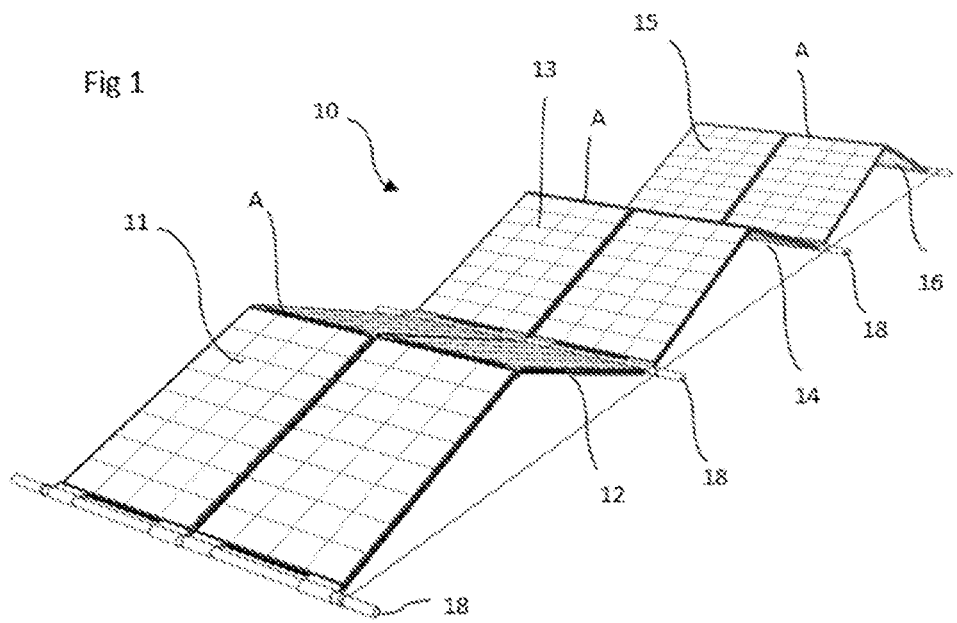
FIG. 1 is a perspective view of a portable PV array in an open or operational condition.
Figure 2:
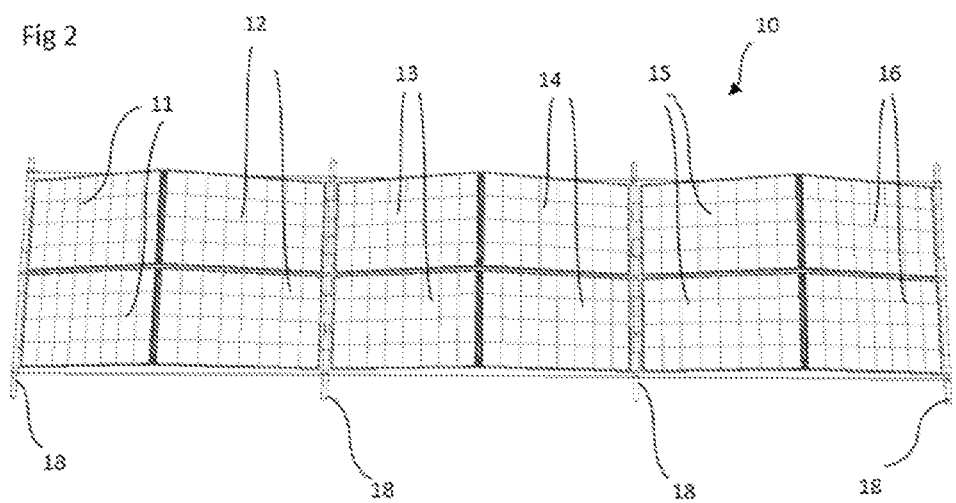
FIG. 2 is a top plan view of the PV array of FIG. 1.

FIG. 1 is a perspective view of a portable PV array 10 in an open or operational condition in which modules of the array are disposed in a triangular configuration to form an east-west (EW) array. FIG. 2 is a plan view of the FIG. 1 arrangement.

The array 10 includes two parallel or adjacent rows of PV modules each comprising a first planar PV module 11 and a second planar PV module 12 connected at a top apex A. The connection at the apex A is a hinge connection so that the PV modules 11 and 12 may be folded together for storage and transport.

The PV modules 11 and 12 are repeated in further pairs of modules 13,14 and 15,16. Each pair of PV modules is connected at the apex between them and is foldable, so that the entire array 10 shown in FIG. 1 can be folded for storage and transport.

Bottom ends of the pairs of modules connect to bars 18 that are provided to support the PV array 10 on a ground surface, such as an earth surface. The bars 18 can take any suitable form and can be concrete rails for example. The bars 18 connect with the bottom ends of the PV modules again to allow folding of the modules for storage and transport. The bars 18 are located at the bottom or valley between pairs of modules.

Each of the modules 11-16 is of square configuration, although they can equally be of rectangular configuration. Each of the modules 11-16 comprise a grid or matrix of 8×4 PV cells.

As explained above, if the PV array 10 is oriented east-west (as it is intended to be), the sun's rays first strike the east facing modules 11,13 and 15 in the morning and progressively move over the modules 11-16 so that the rays finish striking the west facing modules 12, 14 and 16 at the end of the day. During a major portion of the sun's path over the PV array 10, rays will strike all modules, but at opposite ends of the day, the rays will strike predominantly or exclusively, just the east, or just the west modules. Accordingly, at opposite ends of the day only the east or the west modules will produce the majority of the electrical current. Moreover, depending on the angle of incidence, the east and west facing modules of the PV array 10 will generate different amounts of electrical current, except when the sun is directly over the top of the PV array 10.

For this reason, as explained earlier, it is the preference in east-west PV arrays that east facing PV modules be connected together and not connected in series with the west facing PV modules, and the same for the west facing modules, in order to avoid limiting the power output of the PV system due to the non-uniform sun radiation across the east facing and west facing arrays and to maximise the efficiency of electrical output from the PV array 10. For example, early in the morning, the sun's rays will only strike the east facing PV modules 11, 13 and 15 and so only those modules will produce electricity, whereas the west facing modules 12, 14 and 16 will not. This means that transmission of the electrical current produced by the east facing PV modules 11, 13 and 15 cannot be made though the west facing PV modules 12, 14 and 16, given that if the west facing PV modules 12, 14 and 16 are not producing electrical output themselves, they will not transmit electrical current from the east facing PV modules 11, 13 and 15. Accordingly, if the east and west facing PV modules were connected in series, the output of the PV array 10 would be low or zero when the sun's rays are only striking the east facing PV modules 11, 13 and 15. The same will occur at the end of the day when the sun's rays will only strike the west facing modules 12, 14 and 16 and not the east facing PV modules 11, 13 and 15.

It follows, that if the east and west facing PV modules were connected together in series, perhaps for simplicity, at opposite ends of the day when the difference in the electrical production between east and west facing PV modules is most pronounced, the efficiency of electrical output would be compromised. Accordingly, by connecting the east facing PV modules 11, 13 and 15 to each other and west facing modules 12, 14 and 16 to each other, the respective modules will be producing electrical output independently and so the PV array 10 will produce electricity as soon as the sun's rays strike the PV array 10 and the efficiency of production will be maximised throughout the day.

Figure 3:
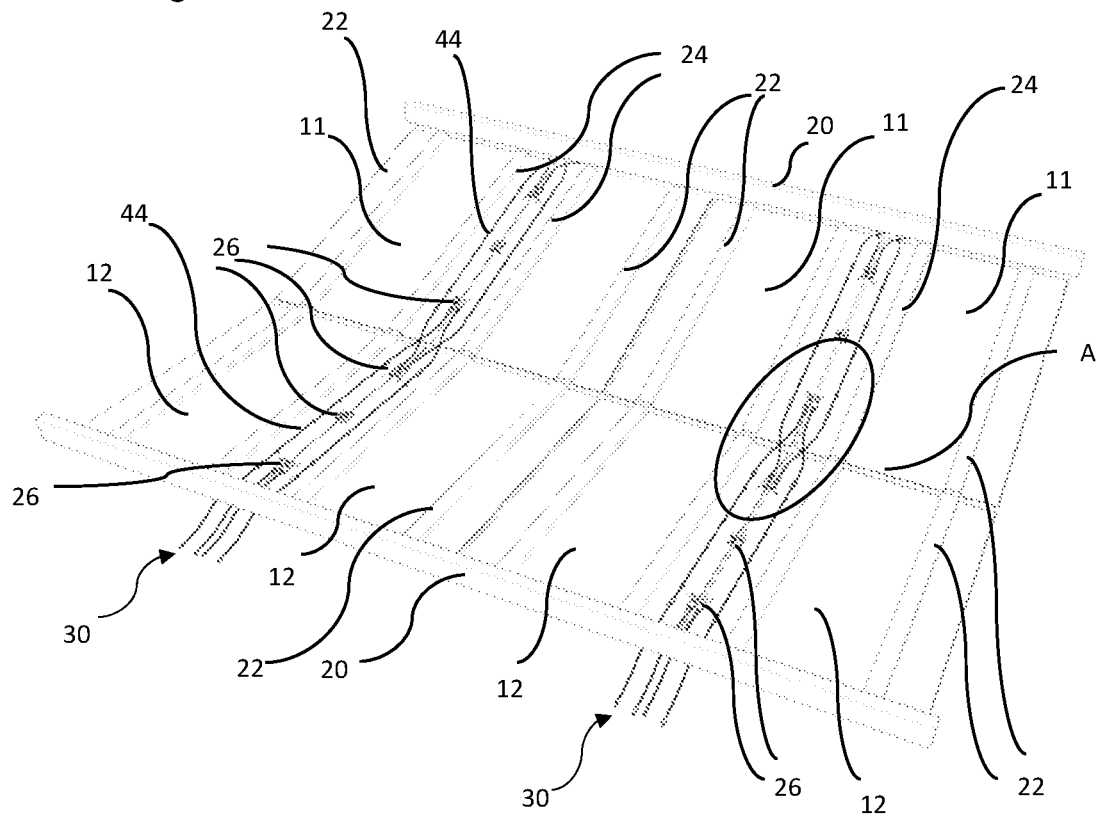
FIG. 3 is an underneath view of eight PV modules connected across an apex between them.

In the PV array 10, the PV modules 11-16 each have a first pair of terminals in electrical connection with the PV cells to draw electrical current from the PV module. The first terminals are located on the underneath of the PV modules. FIG. 3 is a view of the underneath of a pair of PV modules, such as PV modules 11,12. This view shows the bars 18 of FIGS. 1 and 2 as rails 20 and further shows structural rails 22 and 24 extending along the underneath face of the PV modules to provide support across the body of the PV module between the end edges. These rails can be extruded rails 22 and 24 such as from steel, aluminium or composite materials.

FIG. 3 illustrates multiple junction boxes 26, hereinafter referred to as "terminals 26" extending adjacent to the structural rails 24 between pairs of adjacent PV modules. These terminals electrically connect to the PV cells of the PV modules to form outputs from the PV modules. These terminals can also provide PV module protection functions such as by including by-pass diodes. Connections between the terminals 26 enable connection of rows of PV modules in electrical strings. The circled section in FIG. 3 includes terminals at the ends of the PV modules that are illustrated in detail in FIG. 4 and show how the east facing PV modules 11 can be connected to by-pass the west facing module 12 (noting that reference to "east" and "west" here is a reference to the triangular configuration of PV modules of a PV array rather than to an actual directional limitation, as explained earlier herein. FIG. 3 shows various cables that will be described in detail in relation to FIG. 4 that connect between the terminals 26 and between PV modules in rows of modules. The cables 30 are shown in FIG. 3 as bridging the apex A and extending beyond the rail 20.

Figure 4:
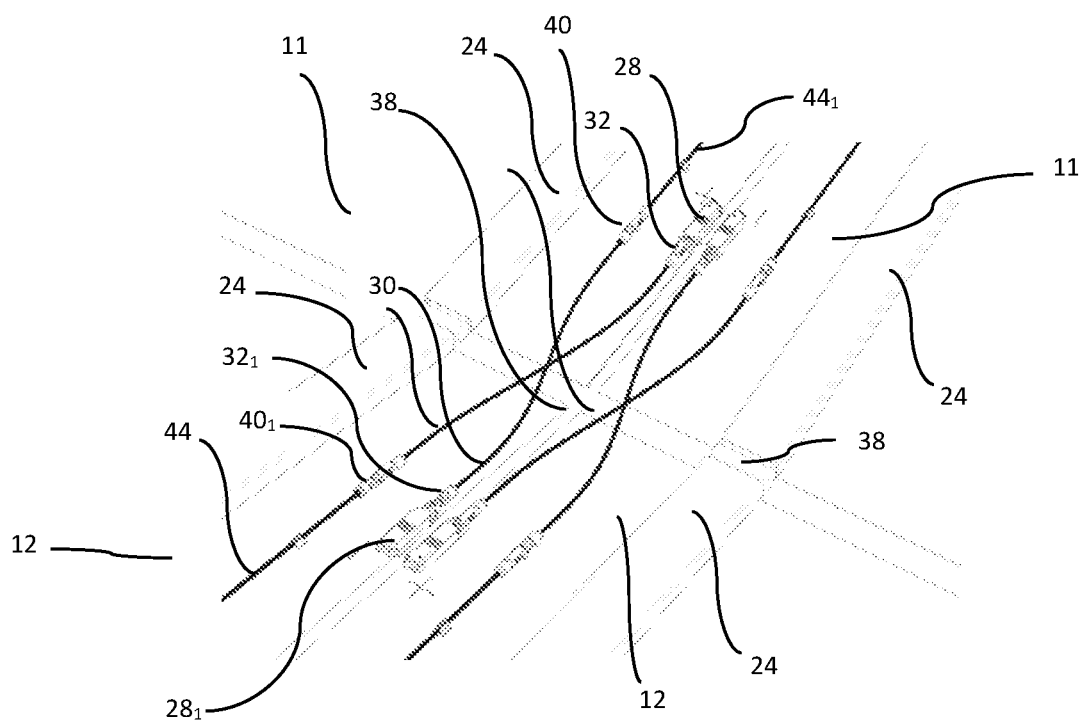
FIG. 4 is a detailed view of the electrical connections between four connected PV modules of FIG. 3.

In FIG. 4, two adjacent sets of cabling are illustrated, but the cabling is identical and so only one set of cabling is described. The cabling of FIG. 4 includes a first pair of terminals 28, $28_1$ that form end terminals of the multiple terminals 26 (FIG. 3) adjacent the respective edges of the PV modules 11 and 12. The terminals 28, $28_1$ each connect to the PV cells of the PV modules 11 and 12. These terminals 28, $28_1$ are the point at which electrical current can be drawn from the PV modules 11 and 12. The terminals 28, $28_1$ have a cable 30 and a connector 32, $32_1$. The connectors 32, $32_1$ connect to by-pass conductors 44 via the cables 30. The connectors 32, $32_1$ can be snap connectors or bayonet connectors for example for connection to the terminals 28, $28_1$.

The cables 30 extend across the junction or apex A between the PV modules 11, 12. It can be seen in FIG. 4 that the rails 24 of the respective PV modules 11, 12 connect together via a hinge 38. The hinge 38 permits the modules 11, 12 to fold together for storage and transport.

The cables 30 each connects to a terminal 40, $40_1$ which connects to a by-pass conductor 44 that takes the form of a cable. The by-pass conductors 44, $44_1$ extend fully along the rails 24 of the PV modules 11, 12, for example to connect to the next PV module, such as the PV module 13 of FIGS. 1 and 2. The by-pass conductor $44_1$ that extends along the rail 24 of the PV module 11 could connect to another PV module, or it could terminate in a take-off as will be described later herein. The by-pass conductor $44_1$ extends along the rail 24 to the terminal 40 which connects to the cable 30. The cable 30 connects to the connector $32_1$ that connects to the terminal $28_1$ of the first pair of terminals 28,$28_1$.

The first pair of terminals of a first, east facing PV module connect with the second pairs of terminals of a pair of second, west facing PV modules on either side of the first, east facing module. The terminals in the figures are illustrated by parts 28, $28_1$ and 40, $40_1$. Given that the second pairs of terminals 40, $44_1$ connect to by-pass conductors, the first terminals of the first, east facing PV module connect to the by-pass conductor of both of the west facing PV modules and thus by-pass the west facing PV modules electrically. The by-pass conductors of both of the west facing PV modules connect to the first terminals of the east facing modules on either side of the west facing PV modules and thus electrically connect the first, east facing PV module to the next east facing modules. This is repeated throughout an east-west PV array.

Thus, with respect to FIGS. 1 and 2, the first PV module 11 has a first pair of terminals on the underside thereof so that they are not visible in FIG. 1, but the terminals are adjacent the bar 18 and the apex A respectively. The first PV module 11 also has a second pair of terminals again that are not visible in FIG. 1, but the terminals are also adjacent the bar 18 and the apex A respectively. The first terminal of the PV module 11 that is adjacent the apex A connects to the second terminal of the PV module 12 that is adjacent the apex A by a cable that extends across the junction between the PV modules 11, 12. The by-pass conductor that is connected to the second terminal of the PV module 12 extends downwardly along the PV module 12 to the second terminal of the PV module 12 that is adjacent the bar 18. The second terminal of the PV module 12 that is adjacent the bar 18 connects to the first terminal of the PV module 13 by a cable that extends across the junction between the PV modules 12, 13.

Likewise, the first pair of terminals of the PV module 12 connect respectively to the second terminal of the PV module 11 adjacent the apex A and to the second terminal of the PV module 13 adjacent the bar 18, by cables that extend across the junctions between the PV modules 11,12 and 12,13. Those second terminals connect to by-pass conductors of the PV modules 11 and 13. The by-pass conductor of the PV module 11 extends to a second terminal of the PV module 11 that forms an electrical outlet of the PV array 10. The by-pass conductor of the PV module 13 extends to a second terminal of the PV module 13 adjacent the apex A between the terminal 13 and 14, and the second terminal of the PV module 13 connects to a first terminal of the PV module 14. By that connection the PV modules 12 and 14 are connected electrically.

Accordingly, the east facing PV modules 11 and 13 are connected electrically and the west facing PV modules 12 and 14 are connected electrically, but the east facing modules are isolated electrically from the west facing PV modules. The provision of the first and second pairs of terminals in or on each PV module facilitates this connection.

It will be appreciated that the by-pass conductors 44, $44_1$ of FIG. 4 are cables that can be fixed to the rails 24, or that can extend along the rails 24 under tension between the second pair of terminals 40, $44_1$. Alternatively, the by-pass conductors 44, $44_1$ can be conductive rods for example, that are insulated from the rails 24, such as by sleeves that space the rods away from contact with the rails 24. The by-pass conductors 44, $44_1$ can alternatively be housed within the rails 24 if the rails 24 are constructed to be hollow. The rails 24 can thus be formed as channels within which the by-pass conductors 44, $44_1$ can be housed.

It will be appreciated that the PV modules of the figures can be supplied with the terminals 28 in place and with the cable 30 and a connector 32 connected thereto. The PV modules can further be supplied with the second pair of terminals 40 and the by-pass conductor 44 connected thereto. Then, when the PV modules are connected together by the hinges 38, the connection assembly of the connectors 32 and 40 and the connecting cable 30 can be connected between the first and second terminals of the connected PV modules. This is simply by the snap or bayonet (or other) form of connection between the connectors. The respective connectors can then remain permanently connected thereafter. Alternatively, the connection assembly of the connectors 32 and 40 and the connecting cable 30 can be connected to one pair of the first and second pairs of terminals of the PV modules when the PV modules are produced, so that when PV modules are connected together to form a PV array, only one further connection is required to the adjacent PV module is required. This means that a single connection is required at each top apex and bottom valley between adjacent PV modules.

Automatic connections may also be provided so that as the PV modules are connected together by the hinges 38, the first pair of terminals 28 connect with the second pair of terminals 40, so that manual connection is not required.

As illustrated, it will be evident that the by-pass conductors 44 are conveniently located along the underside of the PV modules and can be connected at the time the PV array is formed. The by-pass conductors 44 therefore form part of the PV array at manufacture of the array and are not applied later, such as when the PV array is deployed on site. The by-pass conductors 44 can be selected based on the electrical output of the PV modules or the PV array and so the load capacity of the by-pass conductors 44 can be varied depending on the size of the PV array for example, or the location of deployment. Moreover, it will be appreciated from FIG. 3, that by-pass conductors can be applied along or through just one of the rails 24, or along or through both, depending on the capacity of the PV modules or the PV array. Three or more by-pass conductors could be employed if the capacity of the PV modules or the PV array justified further by-pass conductors.

Figure 5:
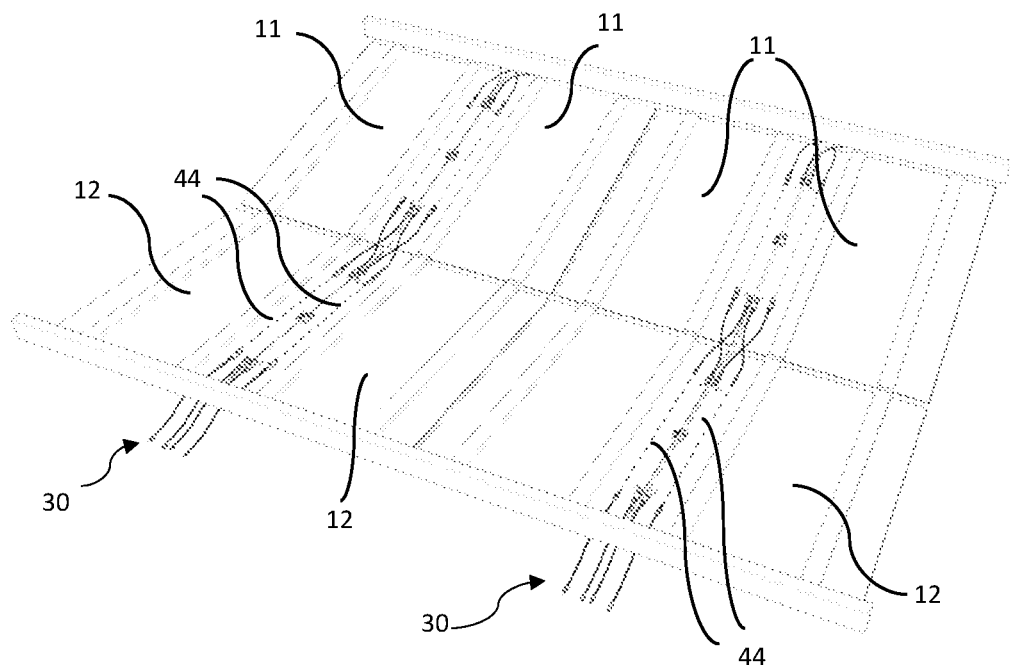
FIG. 5 is an alternative view to the underneath view of FIG. 3.

FIG. 5 is a view which is essentially the same as FIG. 3, with the exception that dashed lines show the location of the by-pass conductors 44 of FIGS. 3 and 4 within the PV modules 11 and 12. This removes the by-pass conductors from underneath the PV modules 11 and 12 and thus provides for increased protection of those conductors and/or for more efficient manufacture of PV modules with integrated by-pass conductors. The cables 30 thus connect to terminals which are electrically connected with the internal by-pass conductors, but otherwise the PV modules of FIG. 5 operate in the same manner as the PV modules of FIG. 3.

The PV modules according to the present invention have been developed for manufacture in any size. They may be developed with a glass-glass laminate sandwiching the PV cells, and they may be frameless and have back or rear (underneath) rail structural support. Actual dimensions of one prototype PV module are 1439 mm×2272 mm glass size, thickness~5.5 mm comprising 2.1 mm glass+1.3 mm encapsulation/cell/wire/ribbon+2.1 mm glass and include two rear support rails. The PV cells are electrically connected via busbars and the first pairs of terminals communicate are electrically connected with the busbars.

The rear structural rails 22 and 24 can take any suitable form.

The adoption of the by-pass conductors 44 and the connection assembly of the connectors 32 and 40 and the connecting cable 36 eliminates the need for edge ducts for housing cables and cable clamps.

Figure 6:
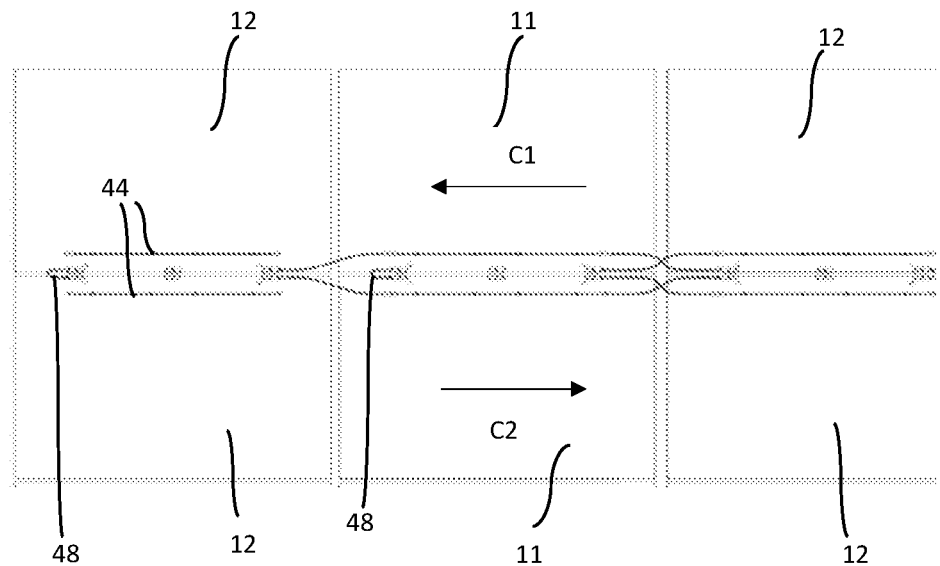
FIG. 6 is a plan view showing a form of turn around arrangement for shifting the direction of current travel.
Figure 7:
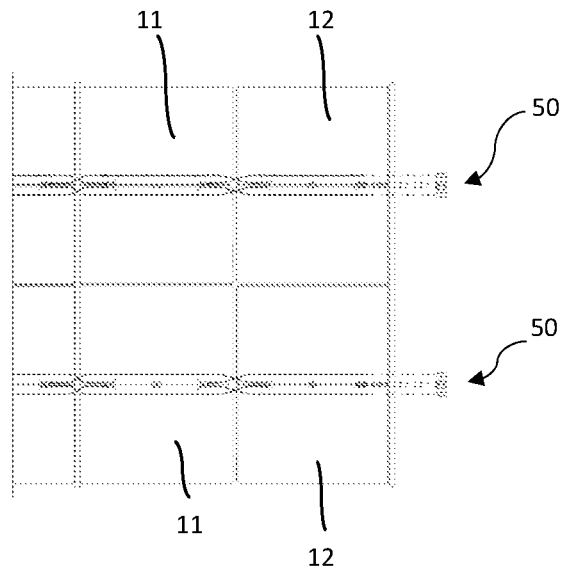
FIG. 7 is a plan view showing the take off cables of electrical strings extending from one side or edge of a PV array.

Generated electricity can be removed from the PV array from either end of the array, or from one end of the array. FIG. 6 shows one end of a PV array in plan view formed according to the arrangement shown in FIG. 4 and shows "turn-around" cables 48 that are used to turn the flow of current from the direction C1 to C2. It will be evident that without the turn around cables 48 in place, the terminals to which the cables 48 attach would ordinarily attach to further by-pass conductors. By this arrangement, all of the electricity generated in the PV array can be collected from one side or end of PV array, rather than collecting electricity from both ends of the PV array. FIG. 7 illustrates this type of arrangement in which four rows of PV modules form a PV array utilising the turn around cables 48 of FIG. 6 so that the take off cables 50 take off from the right hand side of the PV array. The take off cables 50 comprise two strings of east PV modules and two strings of west PV modules.

It is to be noted that the by-pass conductors 44 in the left hand side PV modules 12 of FIG. 6 are redundant but they allow a standard PV module to be employed as an end or edge module with the only modification to that module being the addition of the turn around cable 48.

Figure 8:
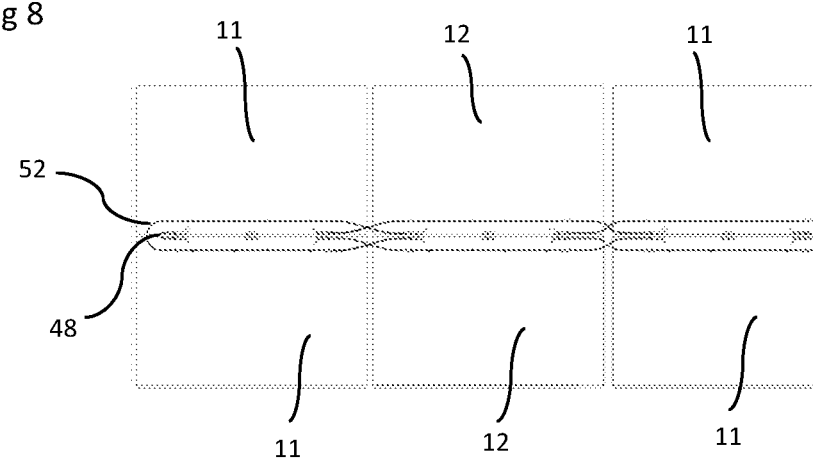
FIG. 8 is a plan view showing an alternative turn around arrangement.

An alternative arrangement is illustrated in FIG. 8, in which an alternative turn around cable 52 is combined with the turn around cable 48 of FIG. 6. In the FIG. 8 arrangement, the redundant by-pass conductors 44 of FIG. 6 are employed with the turn around cable 52, rather than installing the second turn around cable 48 in the PV module 11 of FIG. 6. Again, this enables the standard setup to be used up until the very last PV modules so that in the last or edge PV modules, the two turn around cables 48 and 52 are installed.

It is to be noted that either of the arrangements illustrated in FIGS. 6 and 8 could be employed in the FIGS. 3 and 5 arrangements in the panels 11 adjacent the rails 20 in order to reverse the flow of current through the PV array.

Figure 9:
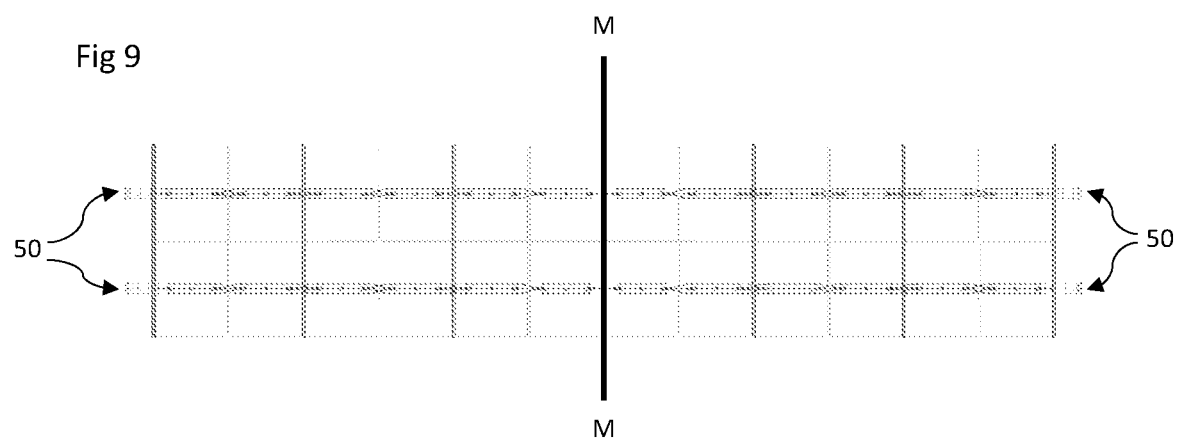
FIG. 9 is a plan view showing the take off cables of electrical strings on each side or edge of a PV array.

It is to be further noted that the turn around arrangements can be employed at any point within a PV array. FIG. 9 illustrates a PV array that employs turn around arrangements through the midpoint of the length of the array (through M-M) of the kind illustrated in FIG. 6. The PV array of FIG. 9 thus has electrical output at each end of the PV array through the take off cables 50. Equally, the PV array of FIG. 9 could employ the turn around arrangement of FIG. 8.

The illustrated arrangements described all employ cables, although they could equally employ solid rods to replace some of the cables, such as the by-pass cables. Also, apart from FIG. 5, all of the cables are external to the PV modules. In all of the figures, cables bridge the apexes and valleys of the PV array. FIG. 10 illustrates an arrangement whereby connection between adjacent PV modules is not by bridging cables, but instead is by an articulated and permanent connection at the apex or valley between the adjacent PV modules. In these forms of the invention, the integrated connectors can connect together with the ability to articulate so that the PV modules can be rotated relative to each other between collapsed and operational conditions without the integrated connectors disconnecting.

FIG. 10 shows a three part connector in which module connectors 54 are attached to the edges of respective PV modules 11 and 12, and interconnectors 56 connect between the module connectors 54. The interconnectors 56 allow movement of the module connectors 54 relative to each other during folding or opening of the PV modules of a PV array. The interconnectors 56 can have pins that engage with the module connectors 54, or cable or wire connectors can be used.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A PV array comprising multiple PV modules, each PV module comprising:
   a. a plurality of PV cells that are connected electrically;
   b. a first pair of spaced apart terminals in electrical connection with the plurality of PV cells to draw electrical current from the PV module;
   c. a second pair of spaced apart terminals and a by-pass conductor connecting the second pair of spaced apart terminals, the by-pass conductor enabling current to pass between the second pair of spaced apart terminals without drawing electrical current from the PV module;
   the multiple PV modules are connected to each other in a triangular configuration so that adjacent PV modules are at an angle to each other and face in opposite directions,
   wherein the second pair of spaced apart terminals of a first PV module of the multiple PV modules are each connected electrically to a terminal of the first pair of spaced apart terminals of two adjacent PV modules to which the first PV module is connected,
   the by-pass conductor of the first PV module of the multiple PV modules facilitates travel of electrical current through, under, over or across the first PV module to a second PV module of the multiple PV modules, by connection of the second pair of spaced apart terminals of the first PV module to the first pair of spaced apart terminals of the second PV module.

2. The PV array of claim 1, wherein the PV array is an east-west array.

3. The PV array according to claim 1, wherein in each PV module, the plurality of PV cells are arranged to form at least two secondary PV modules within a primary PV module connected to each other mechanically and electrically within a frame.

4. The PV array according to claim 3, wherein the primary PV module comprises a pair of spaced apart terminals for each secondary PV module.

5. The PV array according to claim 1, the by-pass conductor of each PV module of the multiple PV modules passing through, under, over or across the PV module between the second pair of spaced apart terminals.

6. The PV array according claim 1, the by-pass conductor of each PV module of the multiple PV modules being electrically insulated or separated from the PV cells of the PV module.

7. The PV array according to claim 6, the by-pass conductor being electrically insulated or separated from the PV cells of the PV module by being enclosed within an insulation layer.

8. A PV module according to claim 7, the by-pass conductor being a cable and the insulation layer being an outer sheath about the cable.

9. The PV array according to claim 1, the by-pass conductor of each PV module of the multiple PV modules being integrated into the PV module.

10. The PV array according to claim 1, the by-pass conductor of each PV module of the multiple PV modules being a solid conductive bar.

11. The PV array according to claim 1, the by-pass conductor of each PV module of the multiple PV modules being an external component of the PV module.

12. The PV array according to claim 1, the by-pass conductor of each PV module of the multiple PV modules being an internal component of the PV module.

13. The PV array according to claim 12, the by-pass conductor extending within frame components of the PV module.

14. The PV array according to claim 1, each PV module of the multiple PV modules including two or more by-pass conductors.

15. The PV array according to claim 1 arranged in an east-west configuration, a first PV module of the multiple PV modules being an east facing PV module which is physically connected to a second PV module of the multiple PV modules which is a west facing PV module at an apex, the by-pass conductor of the west facing PV module facilitating travel of electrical current from the west facing PV module through, under, over or across the west facing PV module, by connection of the second pair of spaced apart terminals of the west facing PV module to the first pair of spaced apart terminals of the east facing PV module.

16. The PV array according to claim 1, the multiple PV modules comprising at least three PV modules comprising an east facing PV module and a pair of west facing PV modules connected to opposite ends of the east facing PV module, a first terminal of the first pair of spaced apart terminals of a first of the west facing PV modules being connected to a second terminal of the second pair of spaced apart terminals of the east facing PV module, and a second terminal of the first pair of spaced apart terminals of the second of the west facing PV modules being connected to the other second terminal of the second pair of spaced apart terminals of the east facing PV module.

17. The PV array according to claim 16, the first pair of spaced apart terminals of one PV module connecting to respective second terminals of a pair of PV modules by a connection assembly comprising a pair of connectors for connecting to first and second terminals of two different PV modules and a connecting cable extending between the pair of connectors.

18. The PV array according to claim 16, the first pair of spaced apart terminals of one PV module connecting to respective second terminals of a pair of PV modules by a connection assembly that comprises integrated connectors associated with the respective PV modules, the integrated connectors connecting together with the ability to articulate so that the PV modules can be rotated relative to each other between collapsed and operational conditions without the integrated connectors disconnecting.

19. The PV array according to claim 1, comprising first and second rows of PV modules in which current flows in a first direction through the first row of PV modules and returns in the opposite direction through the second row of PV modules.

20. The PV array according to claim 19, a first terminal of one PV module in the first row being connected to a first terminal of a PV module in the second row by a cable to reverse the flow of electrical current within the PV array.

21. The PV array according to claim 19, a second terminal of one PV module in the first row being connected to a second terminal of a PV module in the second row by a cable to reverse the flow of electrical current within the PV array.

* * * * *